(12) United States Patent
Fujii

(10) Patent No.: US 7,723,641 B2
(45) Date of Patent: May 25, 2010

(54) BRITTLE MATERIAL SUBSTRATE SCRIBING DEVICE AND SCRIBING METHOD, AND AUTOMATIC ANALYSIS LINE

(75) Inventor: Masahiro Fujii, Suita (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 156 days.

(21) Appl. No.: 10/541,965

(22) PCT Filed: Jan. 8, 2004

(86) PCT No.: PCT/JP2004/000084

§ 371 (c)(1),
(2), (4) Date: Oct. 25, 2005

(87) PCT Pub. No.: WO2004/062868

PCT Pub. Date: Jul. 29, 2004

(65) Prior Publication Data

US 2006/0101858 A1 May 18, 2006

(30) Foreign Application Priority Data

Jan. 10, 2003 (JP) .............................. 2003-004282

(51) Int. Cl.
*B23K 26/00* (2006.01)
(52) U.S. Cl. .................... 219/121.68; 219/121.69; 219/121.7
(58) Field of Classification Search ........... 219/121.67, 219/121.68, 121.69, 121.85, 121.6, 121.7
See application file for complete search history.

(56) References Cited

U.S. PATENT DOCUMENTS

| 4,229,865 A | * | 10/1980 | Fanning ...................... 29/25.42 |
| 5,120,927 A | * | 6/1992 | Williams et al. ........ 219/121.68 |
| 5,502,001 A | * | 3/1996 | Okamoto .................... 438/798 |
| 5,951,891 A | * | 9/1999 | Barenboim et al. ..... 219/121.68 |
| 6,049,056 A | * | 4/2000 | Balamane et al. ....... 219/121.66 |
| 6,211,488 B1 | * | 4/2001 | Hoekstra et al. ........ 219/121.72 |
| 6,303,898 B1 | * | 10/2001 | Xuan ..................... 219/121.68 |
| 6,407,360 B1 | * | 6/2002 | Choo et al. ............ 219/121.67 |
| 6,795,274 B1 | * | 9/2004 | Hsieh et al. ................. 360/135 |

FOREIGN PATENT DOCUMENTS

| JP | 3-27768 | 2/1991 |
| JP | 8-509947 | 10/1996 |
| JP | 2000-281375 | 10/2000 |
| JP | 2001-130921 | 5/2001 |

* cited by examiner

Primary Examiner—M. Alexandra Elve
(74) Attorney, Agent, or Firm—McGlew and Tuttle, P.C.

(57) ABSTRACT

Along a region where a scribe line is formed on a surface of a glass substrate 50, a laser spot is continuously applied for heating at a temperature lower than a softening point of the glass substrate 50, and a region in the vicinity of the heated region is cooled. In this manner, a blind crack is formed along a line to be scribed. A detection unit 40 applies light to the blind crack, immediately after formed in the vicinity of to a cooling spot, through an optical fiber 41. When the blind crack has been formed, part of the light is obtained in the optical fiber 41 because of diffuse reflection. Therefore, detection of the level of this reflected light allows checking as to whether the blind crack has been normally formed or not.

10 Claims, 9 Drawing Sheets (a)

(b)

(c)

(a)

(b)

BRITTLE MATERIAL SUBSTRATE SCRIBING DEVICE AND SCRIBING METHOD, AND AUTOMATIC ANALYSIS LINE

TECHNICAL FIELD

The present invention relates to a scribing device and a scribing method which are used upon forming a scribe line on a brittle material such as a glass substrate to be used for a flat panel display (hereinafter, referred to as FPD) or a semiconductor wafer, and also relates to an automated breaking line using the device and the method.

BACKGROUND ART

An FPD formed of a pair of glass substrates bonded to one another is produced by mutually bonding two large-sized mother glasses and then breaking the glasses into a predetermined size. When the bonded mother glasses are broken, in a scribe step having a scribing device, scribe lines are previously formed with a cutter on the respective mother glasses, and the mother glasses with the scribe lines formed thereon are conveyed to a break step where vertical cracks immediately under the scribe lines are penetrated (broken) in a thickness direction of the mother glasses. More specifically, the step of breaking a mother substrate is constituted of the scribe step and the break step provided after the scribe step.

In recent years, a method of using a laser beam for formation of a scribe line has come into practical use in the scribe step, as disclosed in Japanese Patent No. 3027768. In a method for forming a scribe line on a glass substrate by the use of a laser beam, as shown in FIG. 1, a glass substrate 111 is irradiated with a laser beam from a laser oscillation device 112. The laser beam emitted from the laser oscillation device 112 forms an elliptical laser spot LS on the glass substrate 111 along a line to be scribed. The glass substrate 111 and the laser beam emitted from the laser oscillation device 112 are relatively shifted along a longitudinal direction of the laser spot.

Moreover, a cooling medium, such as cooling water, is sprayed from a cooling nozzle 113 in the vicinity of the laser-beam irradiation region on a surface of the glass substrate 111, so as to form a scribe line. On the surface of the glass substrate 111 irradiated with the laser beam, compression stress generates due to heating by the laser beam and, thereafter, tensile stress generates due to the spraying of the cooling medium. Therefore, since the tensile stress generates in the region in the vicinity of the region where compression stress has generated, a stress gradient occurs between the two regions according to the respective stresses, and for generating a blind crack (vertical crack) formed at an end of the glass substrate 111, a blind crack (vertical crack) is formed from a cutout (trigger) along the line to be scribed on the glass substrate 111.

Since the vertical crack, formed on the surface of the glass substrate 111 by the use of the laser beam in the manner as described above, is minute and thus normally invisible to the naked eye, the crack is called a blind crack BC.

After the blind crack (vertical crack) BC as the scribe line is formed on the glass substrate 111, the glass substrate 111 is conveyed to the subsequent break step, where a force is applied onto the glass substrate such that a bending moment acts in a width direction of the blind crack BC, to allow the vertical crack to penetrate in the thickness direction of the glass substrate, and the glass substrate 111 is thereby broken along the blind crack BC as the scribe line.

There are some cases where a blind crack BC is not normally formed with the above-described scribing device when conditions are not appropriately set, the conditions including heating by irradiation energy per unit area of a laser beam, cooling by a cooling medium, and a relative shifting speed of the laser beam and the glass substrate. If the glass substrate on which the blind crack BC has not been normally formed is supplied to the subsequent break step, the glass substrate is not broken along the blind crack BC, which may lead to damage of the glass substrate. When damaged in the break step, the glass substrate cannot be used as a component of an FPD, resulting in loss of economical efficiency as well as deteriorated production efficiency of the FPD. Further, the damage of the glass substrate might cause damage of a device for breaking a glass substrate itself.

It is therefore desirable to check that the blind crack BC has been certainly formed on the glass substrate in the scribing device. However, since the blind crack BC to be formed on the glass substrate is minute, it normally cannot be visually inspected nor directly observed with a CCD camera. Hence, there has been a problem in that normal formation of a blind crack (vertical crack) BC cannot be readily checked in the scribing device.

Further, since there is a possibility that a laser beam emitted from a laser may affect the eye, it is problematic in terms of the safety to visually check the formation of the blind crack under irradiation of the laser beam during scribing.

The present invention solves the above-mentioned problems, and aims to provide a device and a method for scribing a brittle material substrate, which are capable of certainly checking a formation state of a blind crack to be formed on a surface of a brittle material substrate such as a glass substrate to certainly break the brittle material substrate in a step of breaking a brittle material substrate, and also provide an automated breaking line using the device and the method.

DISCLOSURE OF INVENTION

The present invention provides a scribing device for a brittle material substrate, which continuously heats a region along a line to be scribed on a surface of the brittle material substrate at a temperature lower than a softening point of the brittle material substrate and, also, continuously cools a region in the vicinity of the heated region, thereby forming a blind crack along the line to be scribed, the scribing device characterized by comprising: a light guide which is arranged so as to propagate light to and from the region of the blind crack formation in the vicinity of the cooled region on the surface of the brittle material substrate; a light projection unit which emits light through the light guide; a light reception unit which receives, through the light guide, the light emitted from the light projection unit through the light guide and reflected by the blind crack; and a determination unit which distinguishes a light receiving level obtained by the light reception unit.

The present invention also provides an automated breaking line for a brittle material substrate, characterized by comprising: at least one such a device for scribing a brittle material substrate; and at least one device for breaking the brittle material substrate.

The present invention also provides a scribing device for a brittle material substrate, which continuously heats a region along a line to be scribed on a surface of the brittle material substrate at a temperature lower than a softening point of the brittle material substrate and, also, continuously cools a region in the vicinity of the heated region, thereby forming a blind crack along the line to be scribed, the scribing device characterized by comprising: first and second light guides which are arranged so as to respectively propagate light to and from the region of the blind crack formation in the vicinity of the cooled region on the surface of the brittle material substrate; a light projection unit which emits light through the first light guide; a light reception unit which receives, through the second light guide, the light emitted from the light projection unit through the first light guide and transmitted through the blind crack; and a determination unit which distinguishes a light receiving level obtained by the light reception unit.

The present invention also provides an automated breaking line for a brittle material substrate, characterized by comprising: at least one such a device for scribing a brittle material substrate; and at least one device for breaking the brittle material substrate.

The present invention also provides a scribing method for a brittle material substrate, in which a region along a line to be scribed on a surface of a brittle material substrate is continuously heated at a temperature lower than a softening point of the brittle material substrate and, also, a region in the vicinity of the heated region is continuously cooled, so that a blind crack is formed along the line to be scribed, the scribing method characterized by comprising: emitting light through a light guide toward the region of the blind crack formation in the vicinity of the cooled region on the surface of the brittle material substrate; receiving reflected light, obtained from the blind crack, through the light guide; and performing scribing while checking a condition of the blind crack formation based on a light receiving level.

The present invention also provides a scribing method for a brittle material substrate, in which a region along a line to be scribed on a surface of a brittle material substrate is continuously heated at a temperature lower than a softening point of the brittle material substrate and, also, a region in the vicinity of the heated region is continuously cooled, so that a blind crack is formed along the line to be scribed, the scribing method characterized by comprising: emitting light through a first light guide toward the region of the blind crack formation in the vicinity of the cooled region on the surface of the brittle material substrate; receiving light, transmitted through the blind crack, through a second light guide; and performing scribing while checking a condition of the blind crack formation based on a light receiving level.

BEST MODE FOR CARRYING OUT THE INVENTION

Figure 1:
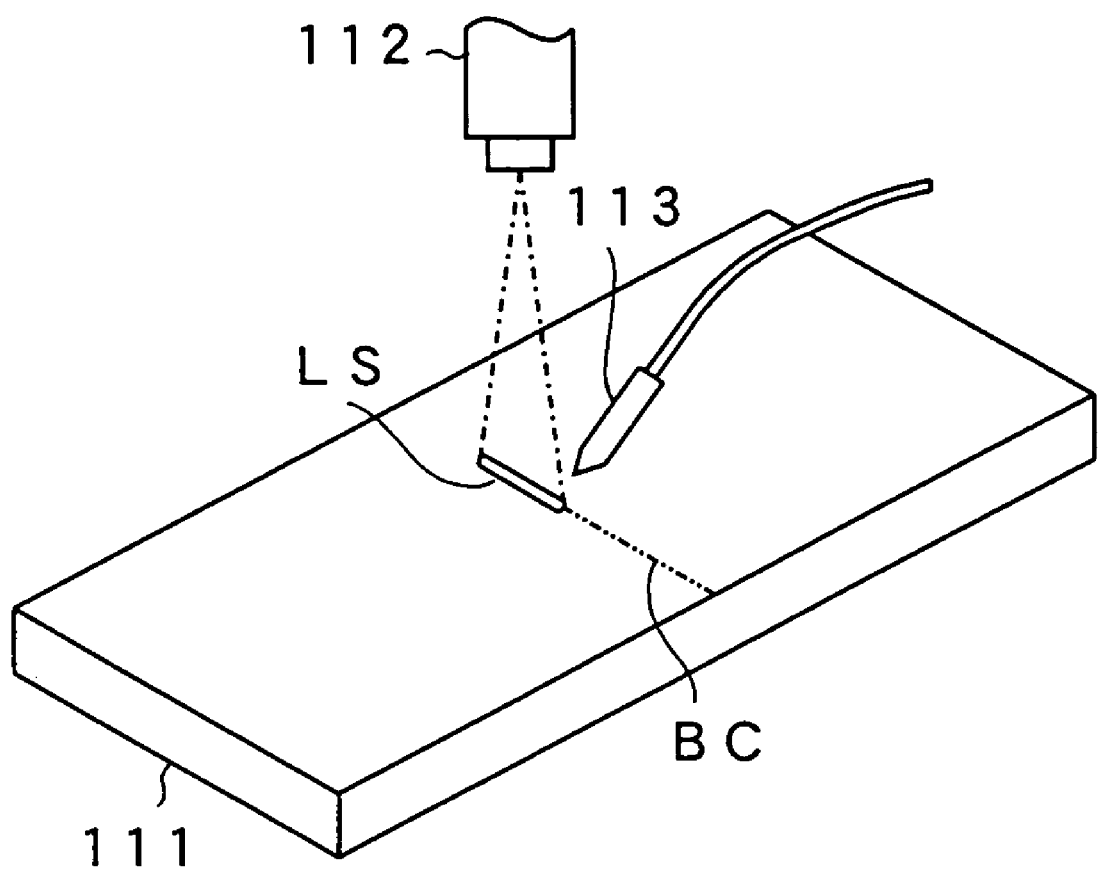
FIG. 1 is a diagrammatic view which explains a method for forming a scribe line with the use of a laser beam.
Figure 2:
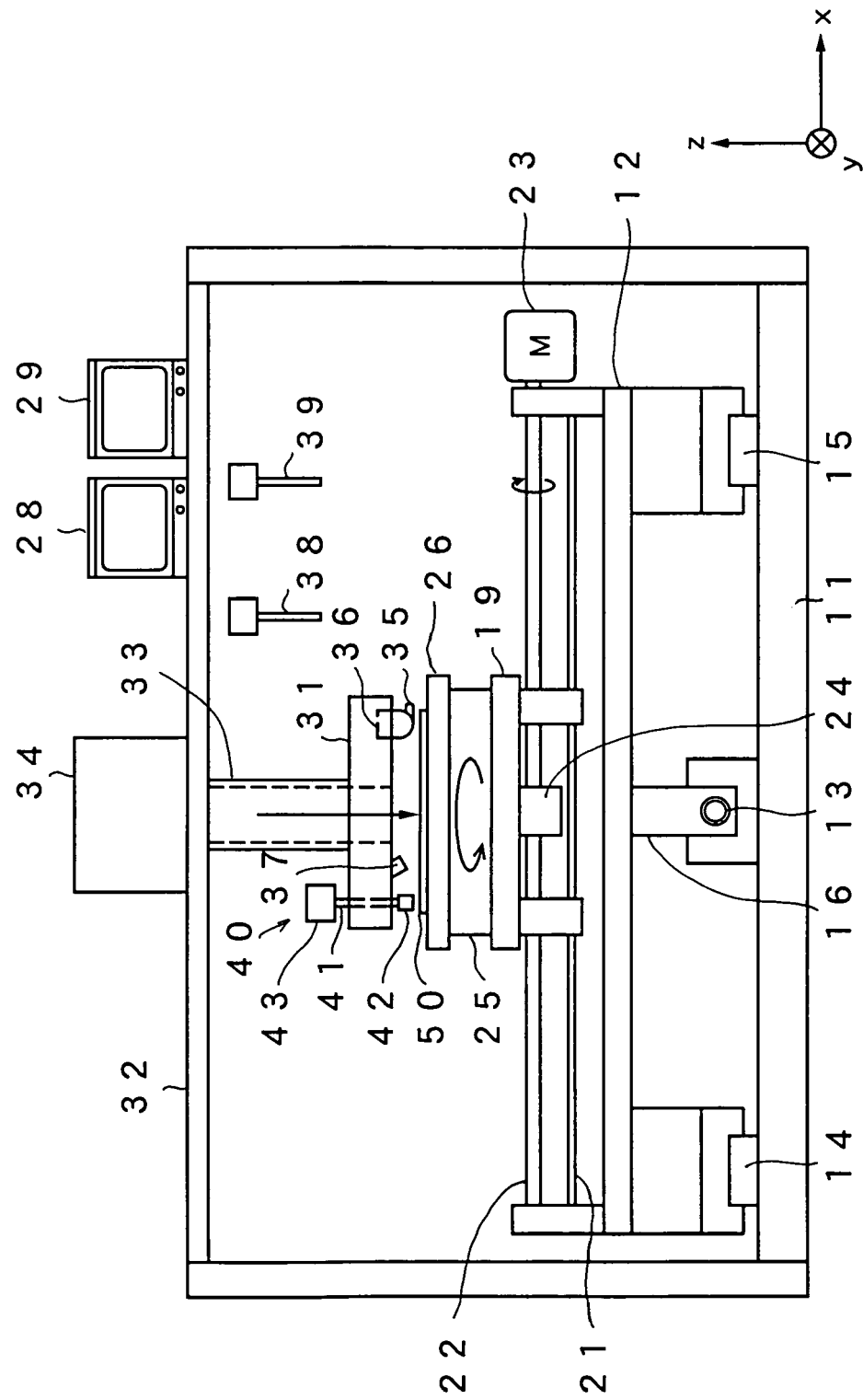
FIG. 2 is a schematic constitutional view of a scribing device for a brittle material substrate according to an embodiment of the present invention.

In the following, devices for scribing a brittle material substrate according to embodiments of the present invention will be described based on drawings. The scribing device is used in one of scribe steps for breaking a glass substrate to be used for an FPD, for example. FIG. 2 is a schematic constitutional view which shows an embodiment of the present invention. This scribing device comprises a slide table 12, which reciprocates along a predetermined horizontal direction (Y direction), on a horizontal base 11.

The slide table 12 is slidably supported by a pair of guide rails 14 and 15, which are arranged in parallel along an upper surface of the base 11, in a horizontal state along each of the guide rails 14 and 15. A ball screw 13 is provided in the middle of the guide rails 14 and 15 so as to rotate in parallel with each of the guide rails 14 and 15 by means of a motor (not shown). The ball screw 13 is rotatable forward and rearward by means of the motor (not shown), and a ball nut 16 is attached to the ball screw 13 in the state of being meshed with together therewith. The ball nut 16 is integrally attached to the slide table 12 in a non-rotating state, and slides in both directions along the ball screw 13 by the forward and rearward rotations of the ball screw 13. Thereby, the slide table 12, to which the ball nut 16 is integrally attached, slides along each of the guide rails 14 and 15 in the Y direction.

A pedestal 19 is arranged in a horizontal state on the slide table 12. The pedestal 19 is slidably supported by a pair of guide rails 21 arranged in parallel on the slide table 12. Each of the guide rails 21 is arranged in an X direction orthogonal to the Y direction as the sliding direction of the slide table 12. Further, in a midsection between each of the guide rails 21, a ball screw 22 is arranged in parallel with each of the guide rails 21, and the ball screw 22 rotates forward and rearward by means of a motor 23.

A ball nut 24 is attached to the ball screw 22 in a state of being meshed with together therewith. The ball nut 24 is integrally attached to the pedestal 19 in a non-rotating state, and moves in both directions along the ball screw 22 by the forward and rearward rotations of the ball screw 22. Thereby, the pedestal 19 slides along each of the guide rails 21 in the X direction.

A rotation mechanism 25 is provided on the pedestal 19, and a rotation table 26 is provided in a horizontal state on the rotation mechanism 25. A glass substrate 50 as an object of scribing is mounted on the rotation table 26. The rotation mechanism 25 is rotated around a central axis along the vertical direction of the rotation table 26, so that the rotation table 26 can be rotated at an arbitrary rotation angle with respect to a reference position. The glass substrate 50 is fixed onto the rotation table 26 with, for example, a suction chuck.

A supporting table 31 is arranged above the rotation table 26 at an appropriate spacing therebetween. The supporting table 31 is supported in a horizontal state by a lower end of an optical holder 33 arranged in a vertical state. An upper end of the optical holder 33 is attached to a lower surface of a mount 32 provided on the base 11. A laser oscillator 34 for oscillating a laser beam is provided on the mount 32, and an optical system, held in the optical holder 33a, is irradiated with a laser beam oscillated from the laser oscillator 34.

The glass substrate 50, mounted on the rotation table 26, is irradiated with the laser beam, with which the inside of the optical holder 33 has been irradiated, from the lower end face of the optical holder 33. At this time, the glass substrate 50 is irradiated with the laser beam as an elliptical laser spot long extended along a predetermined direction by the optical system held in the optical holder 33.

A cutter wheel tip 35 for forming a cutout (trigger) on the surface of the glass substrate 50 is provided under the supporting table 31. This cutter wheel tip 35 is used for forming a cutout (trigger) as a trigger for forming a blind crack (vertical crack) along the longitudinal direction of the laser beam with which the end of the glass substrate 50 is irradiated, and the cutter wheel tip 35 is ascendably/descendably held by a chip holder 36.

The supporting table 31 is provided with a cooling nozzle 37 in proximity to the optical holder 33 such that an arrangement position of the cooling nozzle 37 is changeable. From this cooling nozzle 37, a cooling medium, such as cooling water, He gas, $N_2$ gas or $CO_2$ gas, is sprayed onto the glass substrate 50. The cooling medium is sprayed from the cooling nozzle 37 onto a position in proximity to the end of the longitudinal direction of the laser spot from the optical holder 33, with which the glass substrate 50 is irradiated.

Further, the scribing device comprises a pair of CCD cameras 38 and 39 for picking up alignment marks previously patterned on the glass substrate 50, and monitors 28 and 29 are provided on the mount 32, which respectively display images picked up by the CCD cameras 38 and 39.

The supporting table 31 is provided with a detection unit 40 in proximity to the cooling nozzle 37. The detection unit 40 detects whether a blind crack (vertical crack) has been normally formed or not in a region in proximity to the cooling medium sprayed from the cooling nozzle 37 onto the glass substrate. For example, a photoelectric sensor is used as the detection unit 40, and constituted by including an optical fiber 41, a light projecting/receiving part 42 and a determination unit 43.

In the case of scribing the glass substrate 50 with the use of such a scribing device, first, the glass substrate 50 to be broken into a predetermined size is mounted on the rotation table 26 of the scribing device, and then fixed thereto by suction means. Subsequently, alignment marks provided on the glass substrate 50 are picked up by the CCD cameras 38 and 39. The picked up alignment marks are displayed on the monitors 28 and 29, and the positional information on the alignment marks are processed in an image processing device (not shown) for positioning a table. Thereafter, the rotation table 26 mounting the glass substrate 50 is positioned at a predetermined position with respect to the supporting table 31, and the glass substrate 50 is then scribed with the use of a laser beam. When the glass substrate 50 is scribed, a longitudinal direction of an elliptical laser spot, with which the surface of the glass substrate 50 is irradiated, from the optical holder 33 is an X direction along a scribe line to be formed on the glass substrate 50. The rotation table 26 is positioned by the slide of the pedestal 19 on the slide table 12 and the rotation of the rotation table 26 by the rotation mechanism 25.

Figure 3:
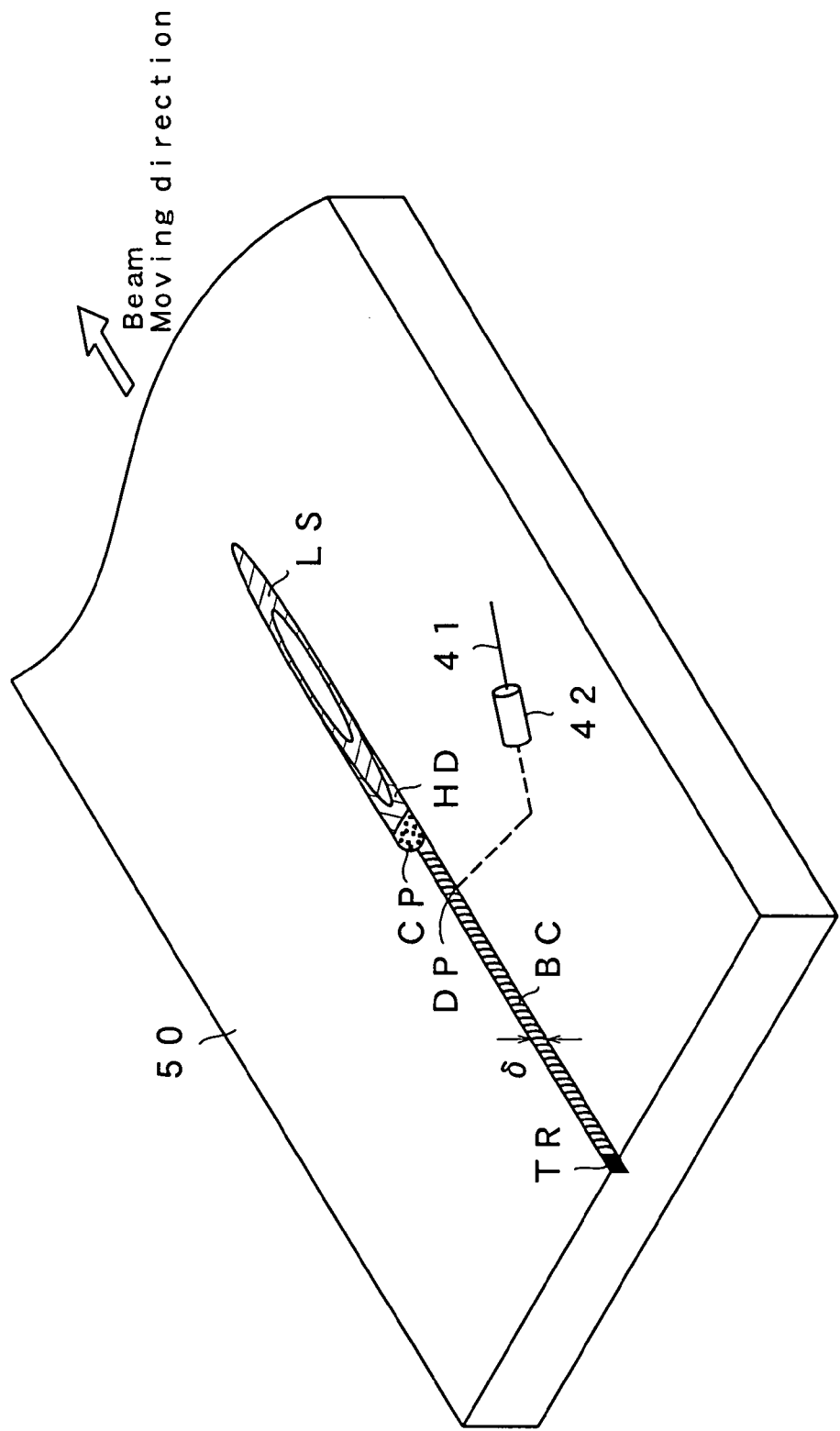
FIG. 3 is a perspective view which diagrammatically shows a laser-beam irradiation position on a glass substrate during formation of a scribe line with the use of the scribing device according to the embodiment of the present invention.
Figure 4:
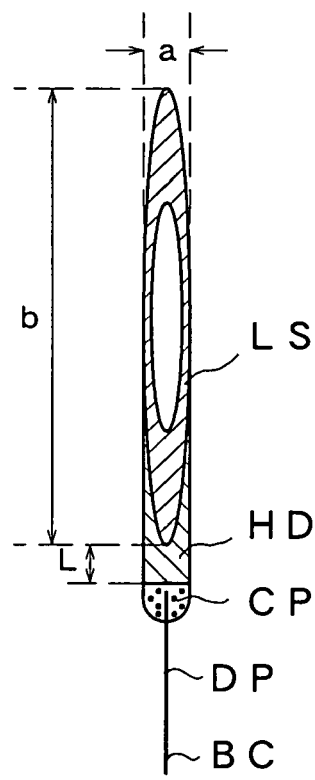
FIG. 4 is a plan view which diagrammatically shows a physical state of change on the glass substrate.

FIG. 3 is a diagrammatic perspective view which shows a laser-beam irradiating state on the glass substrate 50 to be scribed by the scribing device. FIG. 4 is a plan view which diagrammatically shows a physical state of change on the surface of the glass substrate 50.

Upon positioning of the rotation table 26 with respect to the supporting table 31, the rotation table 26 is slid along an X-axis direction, so that the end of the glass substrate 50 is opposed to the cutter wheel tip 35. The cutter wheel tip 35 then descends to form a cutout (trigger) TR at the end of the glass substrate 50.

Thereafter, while the rotation table 26 is slid in the X direction along a line to be scribed, a laser beam is applied from the laser oscillator 34. Simultaneously with this, a cooling medium, such as cooling water, is sprayed from the cooling nozzle 37 together with compressed air.

The laser beam oscillated from the laser oscillator 34 forms an elliptical laser spot LS on the surface of the glass substrate 50. The laser spot LS has an elliptical shape with a long diameter "b" of 30.0 mm and a short diameter "a" of 1.0 mm, and is irradiated such that the long axis thereof agrees with the direction of the scribe line to be formed. In this case, a temperature of heating by the laser spot LS is lower than a temperature at which the glass substrate 50 is melted, that is, lower than a softening point of the glass substrate. This enables the surface of the glass substrate 50, irradiated with the laser spot LS, to be heated without melting.

The cooling water is sprayed from the cooling nozzle 37 onto a cooling point CP, which is on the line to be scribed at a spacing of 2.5 mm, for example, in the longitudinal direction of the laser spot LS from the region irradiated with the laser spot LS. This cools the cooling point CP on the surface of the glass substrate 50. Consequently, a temperature gradient occurs in a region between the laser spot LS and the cooling point CP.

Compression stress generates in the region on the surface of the glass substrate 50 which was heated by the laser spot LS, while tensile stress generates on the cooling point CP onto which the cooling water was sprayed. With the compression stress generated in the region heated by the laser spot LS and the tensile stress generated on the cooling point CP cooled by the cooling water, compression stress having generated in a heat diffusion region HD between the laser spot LS and the cooling point CP leads to generation of a large tensile stress at the cooling point CP toward a region on the opposite side to the laser spot LS. Through the use of this tensile stress, the rotation table 26 is slid in the X direction along the line to be scribed, and with this slide, a blind crack BC is formed along the line to be scribed from a cutout (trigger) TR formed at the end of the glass substrate 50 with the cutter wheel tip 35. The blind crack can be visually inspected immediately after the generation thereof, but becomes non-observable several seconds later.

A depth (δ) of the blind crack BC depends upon a size of the laser spot LS, a size of the heat diffusion region HD and a shifting speed V of the laser spot LS, the cooling point CP and the glass substrate 50, and this can be expressed by the following formula (1). It is noted that "a" is the short diameter of the laser spot LS, "b" is the long diameter of the laser spot LS, L is a length along the scribe line in the heat diffusion region HD (spacing between the laser spot LS and the cooling point CP), "k" is a coefficient depending on a heat physicality of a material as an object of scribing (glass substrate), heating beam irradiation density, and the like.

$$V = k \cdot a(b+L)/\delta \tag{1}$$

As described above, as one example, when a short diameter "a" of the laser spot LS is 1.0 mm, a long diameter "b" of the laser spot LS is 30.0 mm, a length L along a scribe line in the heat diffusion region HD is 2.5 mm, a shifting speed of the glass substrate 50 is 300 mm/sec, and a power of the laser beam is 80 W, a depth of the blind crack BC is 120 µm. These numeric values are selected so as to be optimally combined depending on various conditions for processing, and then used for scribing.

Figure 5:
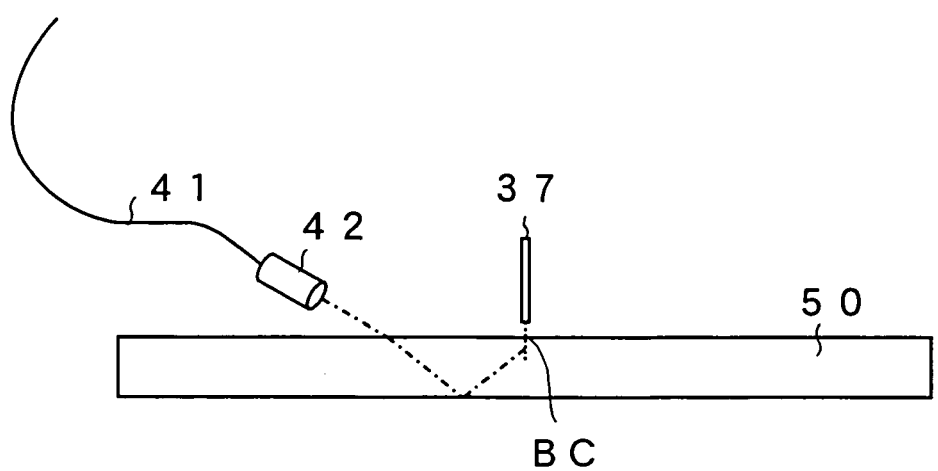
FIG. 5 is a side view which shows a reflecting state of light projected from a fiber-optic sensor onto the glass substrate according to the embodiment of the present invention.

As shown in FIG. 3, the cooling point CP is located immediately behind the laser spot LS, and a vertical crack occurs immediately behind the cooling point CP, as described above. Since this vertical crack soon becomes the blind crack BC, light is projected from the light projecting/receiving unit 42 of the photoelectric sensor toward the detection point DP immediately behind the detectable cooling point CP. As shown in FIGS. 3 and 5, the projected light is once reflected on the lower face of the glass substrate 50, the blind crack is irradiated with the reflected light, the light is reflected diffusely by the blind crack, and part of the diffusely reflected light is obtained in the light projecting/receiving unit 42 of the photoelectric sensor. A photodiode of the determination unit in the photoelectric sensor converts a light amount level of the reflected light into an electric signal and then amplifies the signal. The condition of the scribe line (blind crack BC line) is detected by the discrimination of the amplified signal using predetermined thresholds. Further, a light guide is used for projecting light from the light projecting/receiving unit 42 of the photoelectric sensor toward the detection point DP, and for receiving reflected light diffusedly reflected by the blind crack. An optical fiber or an optical waveguide film is used as the light guide, and in the description of the present invention, the optical fiber is used as one example of the light guides.

Figure 6:
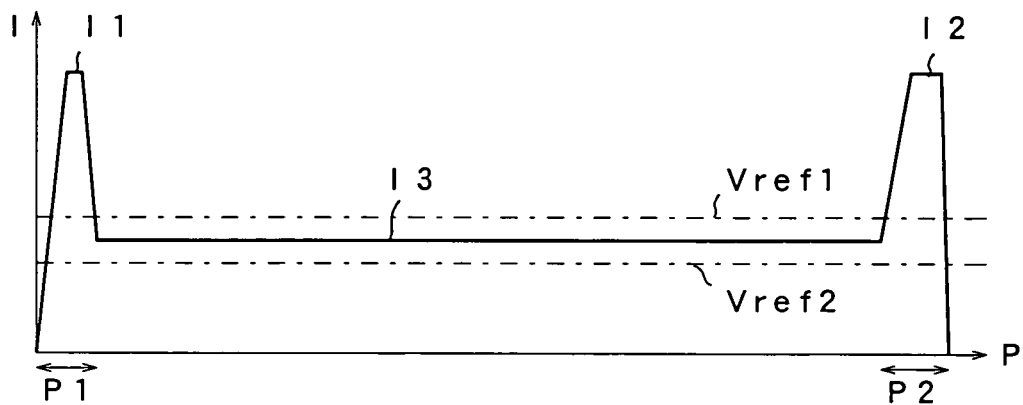
FIG. 6 shows graphs each of which shows change in amount of the light received with respect to the position on the glass substrate, obtained by a detection unit of the scribing device according to the embodiment of the present invention.
Figure 6:
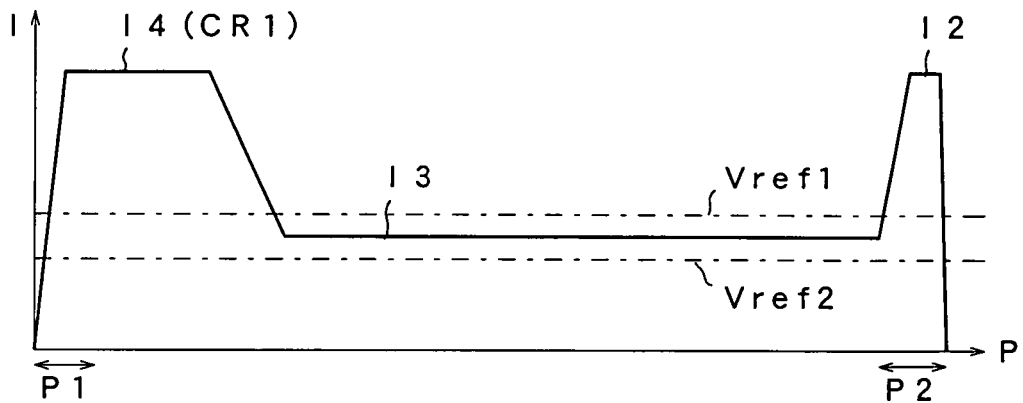
Figure 6:
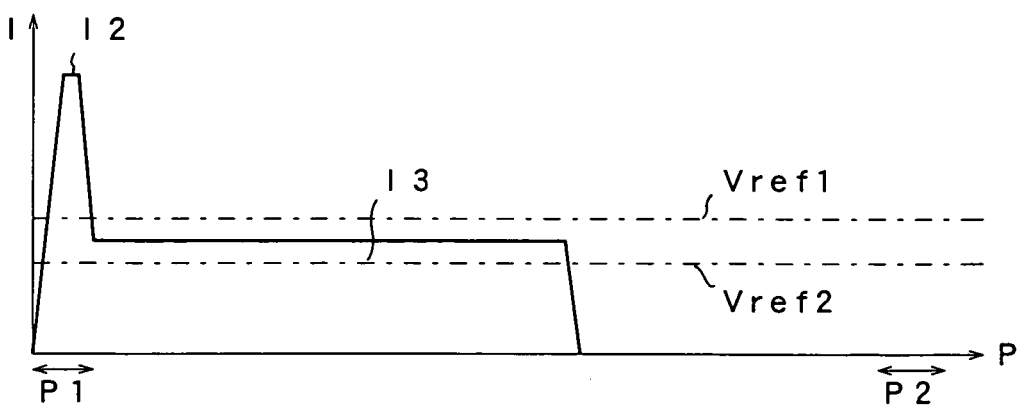
Figure 7:
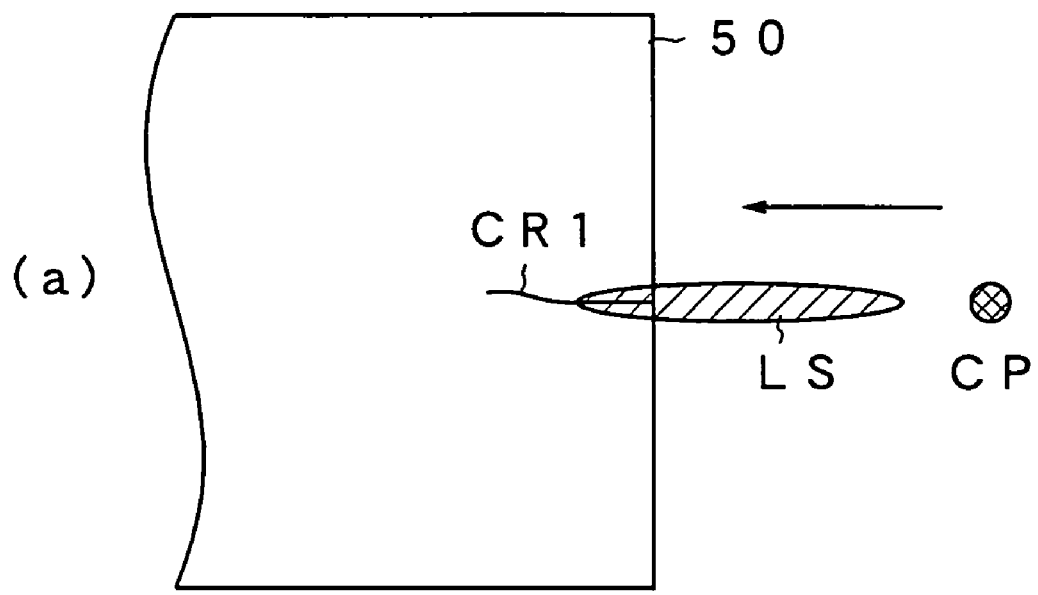
FIG. 7 shows views each of which shows an example of an uncontrollable crack which generates during the scribe line formation process.
Figure 7:
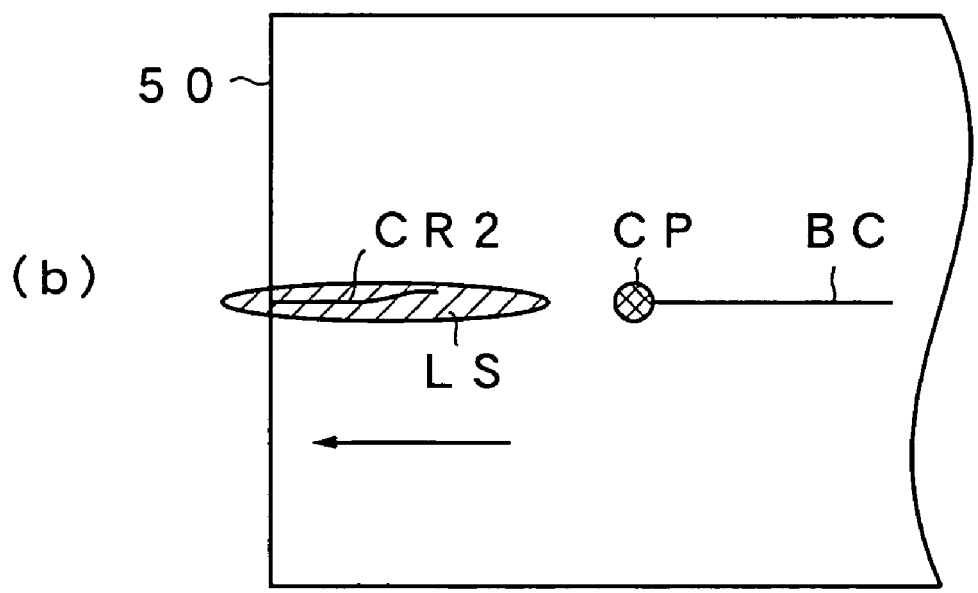

FIG. 6(a) is a graph which shows change in amount (I) of feedback light to the sensor obtained in the optical fiber 41 with respect to a position P on the scribe line along the X direction of the glass substrate 50. When a normal scribe line is formed, while a sensor light amount increases as shown with I1 and I2 in FIG. 6 in the vicinity of a scribe starting point P1 at which scribing of the glass substrate 50 is started and in the vicinity of a scribe ending point P2 at the end of the glass substrate, a sensor light amount I3 between I1 and I2 is almost constant, which checks that the scribe line has been normally formed. Further, as shown in FIG. 7(a), when the side edge of the glass substrate is heated rapidly by the end of the laser spot LS along the line to be scribed, an uncontrollable crack may be formed in front of the laser spot LS on the glass substrate. Such an uncontrollable crack is called an preceding crack CR1, and when this preceding crack CR1 occurs, a light amount level I4 of the preceding crack portion increases, as shown in FIG. 6(b). Moreover, as shown in FIG. 6(c), when a scribe line fails to be formed, reflected light is not obtained, and hence a light amount level detected by the sensor is zero. Accordingly, it is possible to detect a defective state of the blind crack formed on the glass substrate.

Further, as shown in FIG. 7(b), also when a blind crack BC is formed along a line to be scribed and the side edge of the glass substrate in the vicinity of the scribing ending point indicative of completion of heating by the laser spot LS is rapidly heated by the end of the laser spot LS, an uncontrollable crack CR2 may be formed on the glass substrate 50 in the opposite direction to the direction in which the laser spot LS shifts from the side edge of the glass substrate 50. Such a crack CR2 is also uncontrollable, and a reflected light level becomes higher also with the occurrence of this crack CR2. Therefore, predetermined threshold levels Vref1 and Vref2 are set above and below the normal reflected light level. When the reflected light level exceeds the threshold Vref1 in locations other than the end of the glass substrate 50 or the reflected light level is not more than the threshold Vref2, the determination unit 43 of the photoelectric sensor determines the state as defective. When an OK signal is outputted from the determination unit 43 of the photoelectric sensor as one example of the detection units 40, an operation for forming a scribe line (blind crack BC line) on the glass substrate 50 is continuously performed. As opposed to this, when an NG signal is outputted from the determination unit 43 of the detection unit 40, the operation for forming a scribe line (blind crack BC line) on the glass substrate 50 is discontinued, and simultaneously with this, an alarm is issued to inform an operator of occurrence of defect, urging discontinuation of supply of the glass substrate 50 to the post-step.

As thus described, if the blind crack BC is not favorably formed on the glass substrate 50 during the scribing process, an alarm is issued while the scribing process is discontinued. The operator can thereby recognize that the blind crack BC has not been normally formed on the glass substrate 50 under scribing. Hence, the operator removes the glass substrate 50 from the rotation table 26 of the scribing device as a defective product. With this removal, there is no risk of supplying the subsequent break step with a defective glass substrate 50 on which the blind crack BC has not been normally formed.

It is to be noted that, although the optical fiber 41 and the light projecting/receiving unit 42 are provided from the left hand of the blind crack BC for the detection in FIG. 5, the light may be projected from the right hand of the blind crack with the use of the optical fiber 41 and light projecting/receiving part, and from which direction the light is projected can be selected depending on a line to be formed with a blind crack. Further, the light may directly enter the position where the blind crack has been formed, instead of allowing light to be reflected on the lower face of the glass substrate 50 once and then enter the blind crack.

Figure 8:
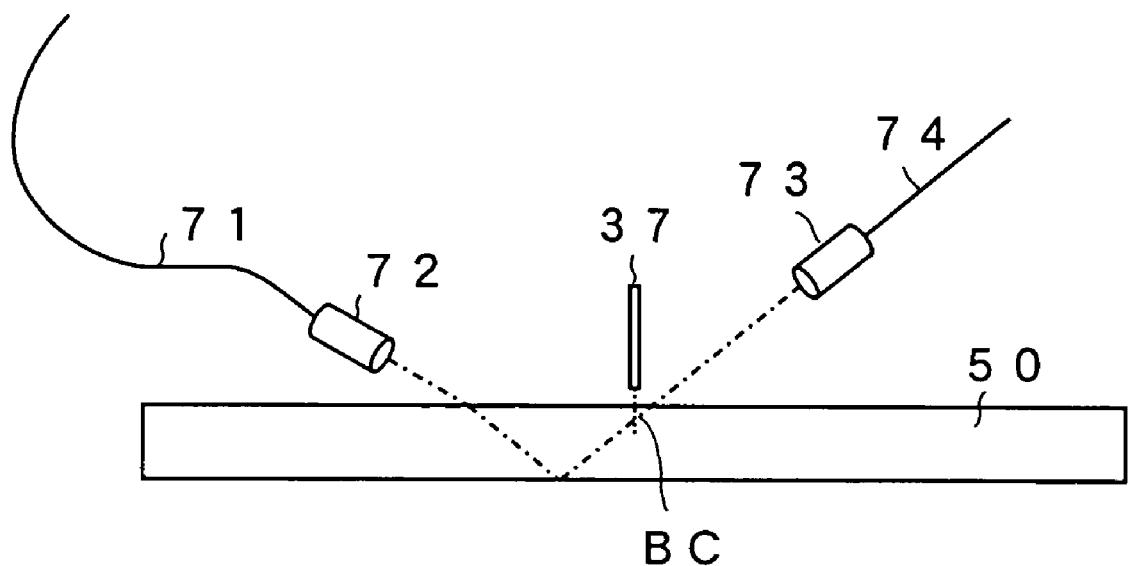
FIG. 8 is a schematic view which shows a detecting state of a detection unit of a scribing device according to a second embodiment of the present invention.

Next, a second embodiment of the present invention will be described. Although one optical fiber 41 is used for light projection/reception in the first embodiment, an optical fiber for light projection and an optical fiber for light reception may be split from one another, and a light projection unit and a light reception unit may be split from one another. FIG. 8 is a view which shows a schematic constitution of a transmissive type detection unit. An optical fiber 71 is a first optical fiber for light projection. The optical fiber 71 is located in the same position as the optical fiber 41 in FIG. 5, and a light projection unit 72 is provided on the distal end of the optical fiber 71. Further, a light reception unit 73 for receiving light transmitted through the position of the blind crack, and a second optical fiber 74 for light reception are provided. Other constitutions are the same as those described in the foregoing embodiment. With the light projection unit and the light reception unit split as described above, it is possible to directly detect an amount of light, which has been transmitted through a position where the blind crack has been formed, out of the projected light, so as to detect whether the blind crack has been normally formed or not. In this case, a transmittance amount is large when the blind crack has not been formed, and the transmittance amount decreases in a portion where the blind crack has been formed. Moreover, if abnormality occurs in formation of a scribe line at the end of the glass substrate 50 due to occurrence of a preceding phenomenon or the like as shown in FIGS. 7(a) and 7(b), a light diffuse reflection level is high in the location where an uncontrollable crack has occurred, and a light receiving level obtained as transmitted light is significantly lowered. Therefore, setting of thresholds above and below the normal transmitted light level enables individual recognition of a normal state where a blind crack (vertical crack) has been formed and the above-mentioned abnormal state.

Figure 9:
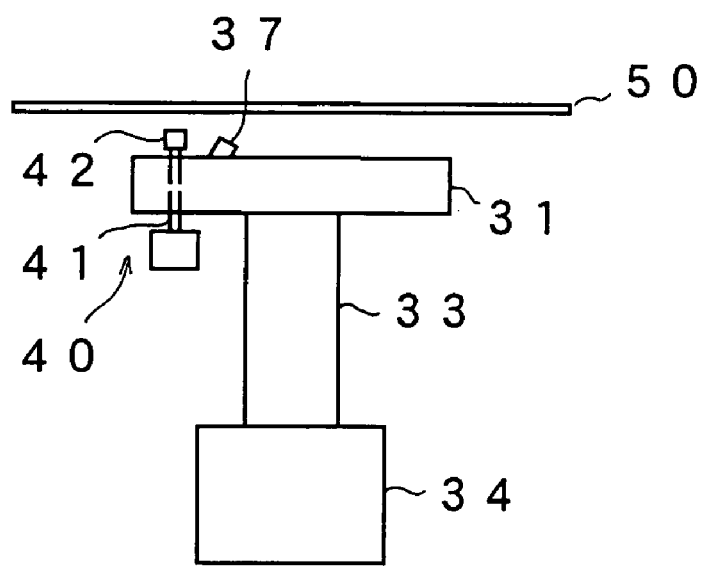
FIG. 9 is a schematic view of a scribing device according to a third embodiment of the present invention.

Next, a third embodiment of the present invention will be described. As shown in FIG. 9, the supporting table 31 provided with the detection unit may be arranged under the table together with the laser oscillator and the cooling nozzle, and a blind crack may be formed from underneath. Even in this case, the detection unit is small enough to be readily arranged on the downside, and implementation of the first embodiment from the downside of the glass substrate 50 enables detection as to whether the blind crack BC has been accurately formed from the downside of the glass substrate 50. Further, as shown in the second embodiment, the light projection unit and the light reception unit of the detection unit may be split from one another.

Figure 10:
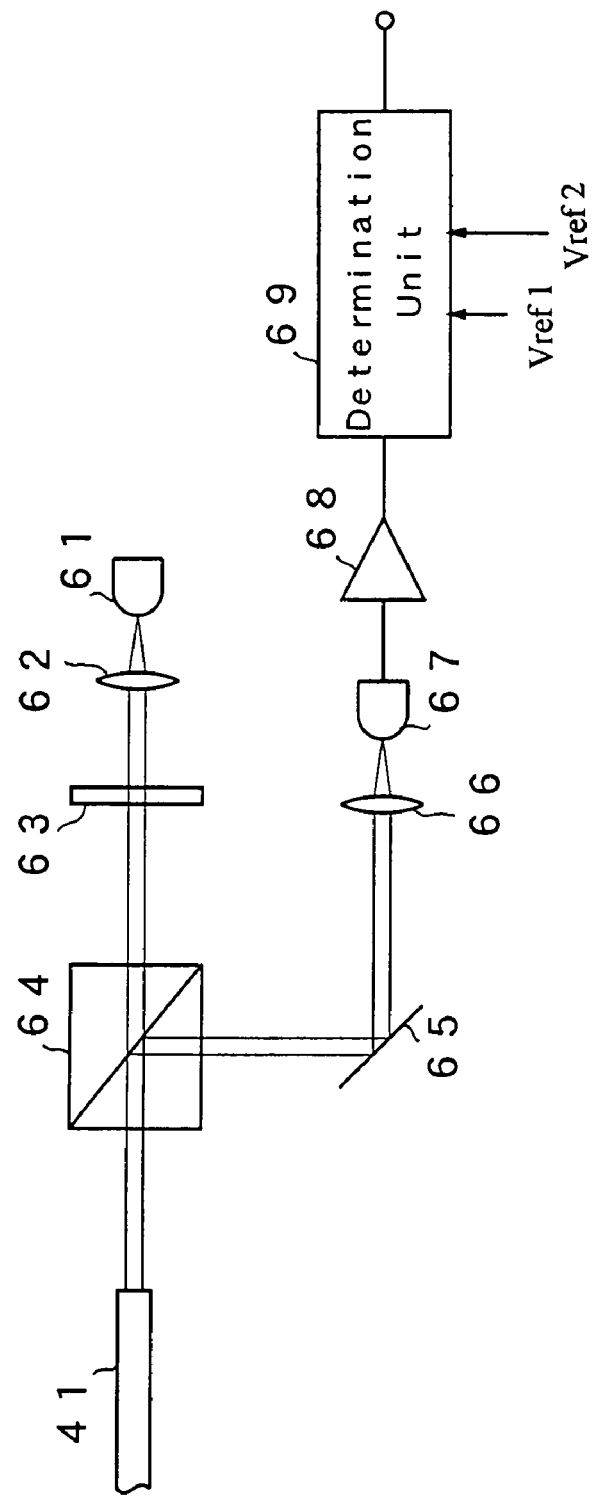
FIG. 10 is a view which shows a constitution of another example of a detection unit of a scribing device according to an embodiment of the present invention.

Next, another example of the detection unit 40 will be described. As shown in FIG. 10, the detection unit 40 may be a unit having a light source as which a laser diode 61 is used. A polarized beam splitter 64 is arranged on a light projection axis of the detection unit 40 through a lens 62 and a polarized filter 63. The polarized filter 63 selects only light in a predetermined polarized direction as irradiated light, and the polarized beam splitter 64 transmits the laser light as it is in the polarized direction selected by the polarized filter 63, to allow reflection of the laser light in the vertical direction to the selected laser light. The foregoing optical fiber 41 is provided on the light projection end of the polarized beam splitter 64. Further, since the reflected light obtained from the optical fiber 41 is polarized in random directions, part of the reflected light is split with the polarized beam splitter 64. It is constituted that the light split by the polarized beam splitter 64 enters a photodiode 67 as a light reception element through a mirror 65 and a lens 66. Further, a signal obtained in the photodiode 67 is amplified with an amplifier 68 to be given to a determination unit (DET) 69. The determination unit 69 is constituted by including a window comparator, and a good or bad determination is made on a condition of the blind crack formation based on whether the amplified signal is on the level between the thresholds Vref1 and Vref2 which are set in the window comparator. Here, the laser diode 61, the lens 62, the polarized filter 63 and the polarized beam splitter 64 constitute a light projection unit for making light enter the optical fiber for the sensor, while the polarized beam splitter 64, the mirror 65, the lens 66 and the photodiode 67 constitute a light reception unit for receiving reflected light through the optical fiber.

Figure 11:
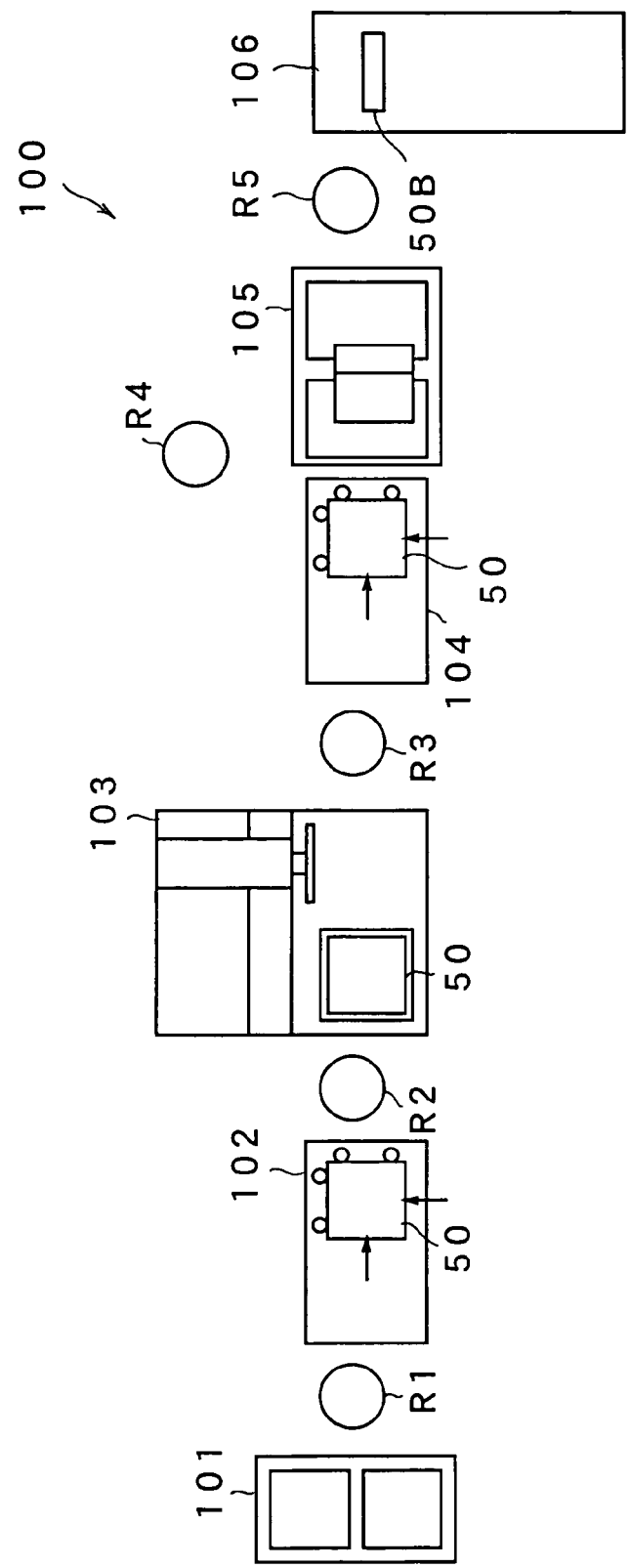
FIG. 11 is a schematic view of an automated breaking line for a glass substrate, showing one example of a line for breaking a glass substrate where a scribing device and, subsequently, a breaking device are incorporated.

FIG. 11 is a schematic diagrammatic view of an automated line 100 for breaking a single panel glass substrate, which shows one example of an automated line for breaking the glass substrate 50 having a breaking device incorporated therein, following the scribing device.

The automated glass substrate breaking line 100 comprises: a cassette loader 101 equipped with a cassette housing the glass substrate 50; a conveyor 102 for mounting the glass substrate 50 having been pulled out of the cassette loader 101 and then positioning the mounted glass substrate 50; a scribing device 103 of the present invention for scribing the glass substrate 50; a conveyor 104 for mounting and then positioning the glass substrate 50 on which a scribe line has been formed; a breaking device 105 which is constituted of a table divided into halves and in which at least one of the divided tables is rotation-shifted downwardly to bend the glass substrate 50 so as to break the glass substrate 50 along the scribe line; and a discharge conveyor 106 for discharging the broken glass substrate 50 (hereinafter, each of the glass substrate broken into a plurality of substrates is referred to as a glass substrate 50B) to the outside of the automated glass substrate breaking line 100. Further, in various locations of the automated glass substrate breaking line 100, a material supply robot R1 and conveyor robots R2 to R5 are respectively provided for supplying the glass substrates under respective states.

Subsequently, the operation of the automated glass substrate breaking line 100 will be described. The glass substrate 50 housed in a cassette of the cassette loader 101 is taken out with the material supply robot R1, and the taken out glass substrate 50 is positioned on the conveyor 102. Thereafter, the glass substrate 50 is held with the conveyor robot R2 to be conveyed into the scribing device 103.

The conveyed glass substrate 50 is mounted on a table in the scribing device 103. As described above, a blind crack BC along a previously designed line is formed on the glass substrate 50 in the scribing device 103. When a predetermined blind crack BC is not favorably formed on the surface of the glass substrate 50 in the scribing device 103, an NG signal is outputted from the detection unit 40, and with this NG signal, the operation of the scribing device 103 is discontinued while an alarm is issued for informing occurrence of abnormality.

On the other hand, when a blind crack BC is favorably formed on the surface of the glass substrate 50 in the scribing device 103, the glass substrate 50 is held with the conveyor robot R3 and mounted on the conveyor 104.

The glass substrate 50 mounted on the conveyor 104 is positioned on the front side of the conveyor 104, and the conveyor robot R4 conveys the glass substrate 50 into the breaking device 105 such that the blind crack BC on the glass substrate 50 is positioned in the middle between the divided tables. In the breaking device 105, the glass substrate 50 on which the blind crack has been formed is broken along the blind crack. A plurality of glass substrates 50B obtained by breaking of the glass substrate 50 in the breaking device 105 are mounted on the discharge conveyor 106 with the conveyor robot R5.

It is to be noted that, as another line constitution, an apparatus constitution can be employed where the glass substrate 50 having no predetermined blind crack BC is automatically discharged from the line 100 when an NG signal generates from the detection unit 40. This makes a totally automated operation possible.

It should be noted that, although the descriptions were given using the glass substrate as the brittle material substrate in the embodiments, the brittle material substrate includes, other than the single panel glass substrate, a semiconductor wafer, a laminated substrate to serve as a liquid crystal panel and a ceramic substrate. The brittle material substrate further includes a mother liquid crystal panel substrate as the laminated substrate, a PDP (Plasma Display Panel), LCOS, and a projector substrate, and the present invention is applicable to the processes of those various brittle material substrates. Further, although the descriptions were given using the optical fiber as the light guide, this is not limitation, and an optical waveguide film and the like can be used as the light guide.

INDUSTRIAL APPLICABILITY

In the present invention, since a blind crack is optically detected, the size of the detection unit can be reduced to readily determine whether the blind crack has been normally formed or not. The scribing device and the scribing method according to the present invention can be employed in the case where a brittle material substrate such as a glass substrate to be used for a flat panel display (hereinafter, refereed to as FPD) or the semiconductor wafer is scribed. With the scribing device and the scribing method applied to an automated breaking line, it is possible to convey only a brittle material substrate, on which a blind crack (vertical crack) line (scribe line) has been normally formed, to the subsequent break step for breaking.

The invention claimed is:

1. An automated breaking line system for a brittle material substrate, the automated breaking line system comprising:
   a device for breaking the brittle material substrate; and
   a scribing device for scribing a brittle material substrate, said scribing device continuously heating a region along a line to be scribed on a surface of the brittle material substrate at a temperature lower than a softening point of the brittle material substrate and continuously cooling a region in the vicinity of the heated region such that a blind crack along said line to be scribed is formed, said scribing device including:
   a light source for emitting light;
   a polarizing beam splitter splitting light from said light source based on a polarization state, said polarizing beam splitter transmitting light in a polarization direction;
   an optical fiber receiving light split via said polarizing beam splitter, said optical fiber guiding said light split via said polarizing beam splitter such that light enters the region of the blind crack formation in an area of the cooled region on the surface of the brittle material substrate, said optical fiber receiving the light reflected by the blind crack such that said optical fiber transmits said light to said polarizing beam splitter;
   a light reception element receiving reflected light from said blind crack via said polarizing beam splitter; and
   a determination unit including a window comparator means for determining whether an amount of light received via said light reception element is within a predetermined upper light receiving threshold Vref1 and a predetermined lower light receiving threshold Vref2 to provide a comparator means output, said predetermined upper light receiving threshold Vref1 being greater than said predetermined lower light receiving threshold Vref2, said determination unit determining a formation state of the blind crack based on said output from said window comparator means, said formation state of the blind crack being a defective formation state when said amount of light received via said light reception element is greater than said predetermined upper light receiving threshold Vref1 or less than said predetermined lower light receiving threshold Vref2, said formation state of the blind crack being a normal formation state when said level of light received via said light reception element is greater than or equal to said predetermined lower light receiving threshold Vref2 and less than or equal to said predetermined upper light receiving threshold Vref1.

2. An automated breaking line system in accordance with claim 1, wherein said shape state of the blind crack is continuously determined based on said output from said determination part when the brittle substrate material is scribed.

3. An automated breaking line system in accordance with claim 1, wherein the brittle substrate material is not scribed when said level of light receiving signal obtained from said light reception element is not within predetermined thresholds.

4. A scribing device for a brittle material substrate, which continuously heats a region along a line to be scribed on a surface of the brittle material substrate at a temperature lower than a softening point of the brittle material substrate and, also, continuously cools a region in the vicinity of the heated region, thereby forming a blind crack along said line to be scribed, the device comprising:
   a light source;
   a polarizing beam splitter splitting light from the light source based on a polarization state, said polarizing beam splitter transmitting the split light in a specific polarization direction;
   an optical fiber arranged such that light transmitted through said polarizing beam splitter enters the region of the blind crack formation in the vicinity of the cooled region on the surface of said brittle material substrate and the light reflected by the blind crack is returned to said polarizing beam splitter;
   a light reception element receiving reflected light from said blind crack via said polarizing beam splitter; and
   a determination unit including a window comparator, said determination unit with said window comparator determining whether a level of light receiving signal obtained from said light reception element is between predetermined thresholds Vref1 and Vref2, Vref1 being greater than Vref2, wherein a shape state of the blind crack is determined based on an output from said window comparator, said determination unit with said window comparator determining a defective blind crack when said level of light receiving signal is greater than Vref1 or lower than Vref2, said determination unit with said window comparator determining a normal blind crack when said level of light receiving signal is between Vref1 and Vref2.

5. A scribing device in accordance with claim 4, wherein said shape state of the blind crack is continuously determined based on said output from said determination part when the brittle substrate material is scribed.

6. A scribing device in accordance with claim 4, wherein the brittle substrate material is not scribed when said level of light receiving signal obtained from said light reception element is not within said predetermined thresholds.

7. A scribing device in accordance with claim 4, wherein said determination unit determines whether said level of light receiving signal is within said predetermined thresholds when light is projected on a surface of said substrate, said determination unit not determining whether said level of light receiving signal is within said predetermined thresholds when light is projected at a scribe starting point of said substrate and a scribe ending point of said substrate.

8. A scribing method for a brittle material substrate, in which a region along a line to be scribed on a surface of a brittle material substrate is continuously heated at a temperature lower than a softening point of the brittle material substrate and, also, a region in the vicinity of the heated region is continuously cooled, such that a blind crack is formed along said line to be scribed, the method comprising:
   providing a determination unit comprising a comparator means;
   splitting light from a light source with a polarizing beam splitter based on a polarization state;
   allowing light in a specific polarization direction, having transmitted through said polarizing beam splitter, to enter the region of the blind crack formation in the vicinity of the cooled region on the surface of said brittle material substrate via an optical fiber;

returning the light reflected by the blind crack to said polarizing beam splitter via said optical fiber;

receiving the light split by said polarizing beam splitter from the reflected light from the blind crack with a light reception element;

determining whether a level of light receiving signal obtained from said light reception element is between a predetermined upper light receiving signal threshold and a predetermined lower light receiving signal threshold with said comparator means to provide a comparator means output, said predetermined upper light receiving signal threshold being greater than said predetermined lower light receiving signal threshold;

determining a condition of the blind crack formation based on said comparator means output with said determination unit when the brittle material substrate is scribed;

continuing to scribe the brittle material when said level of light receiving signal is less than or equal to said predetermined upper light receiving signal threshold and greater than or equal to said predetermined lower light receiving signal threshold, wherein the brittle material is not scribed when said level of light receiving signal is greater than said predetermined upper light receiving signal threshold or less than said predetermined lower light receiving signal threshold.

9. A scribing method in accordance with claim 8, wherein said condition of the blind crack formation of the brittle material substrate is continuously determined.

10. A scribing method in accordance with claim 8, wherein the brittle substrate material is not scribed when said level of light receiving signal obtained from said light reception element is not within predetermined thresholds.

* * * * *